US010017034B2

(12) United States Patent
Van Boxtel (10) Patent No.: US 10,017,034 B2
(45) Date of Patent: Jul. 10, 2018

(54) ROLLO ASSEMBLY (71) Applicant: Inalfa Roof Systems Group B.V., Venray (NL)

(72) Inventor: Eduardus Christianus Henricus Van Boxtel, Zeeland (NL)

(73) Assignee: INALFA ROOF SYSTEMS GROUP B.V., Oostrum (NL)

( * ) Notice: Subject to any disclaimer, the term of this patent is extended or adjusted under 35 U.S.C. 154(b) by 0 days.

(21) Appl. No.: 14/952,561

(22) Filed: Nov. 25, 2015

(65) Prior Publication Data
US 2016/0152125 A1 Jun. 2, 2016

(30) Foreign Application Priority Data

Dec. 1, 2014 (EP) ..................... 14195589

(51) Int. Cl.
*B60J 1/20* (2006.01)
*B60J 3/00* (2006.01)
(Continued)

(52) U.S. Cl.
CPC ............ *B60J 7/067* (2013.01); *B60J 1/2041* (2013.01); *B60J 7/0015* (2013.01); *B60J 7/0023* (2013.01)

(58) Field of Classification Search
CPC ........ B60J 7/067; B60J 7/0023; B60J 7/0015; E06B 9/58; E06B 2009/135; E06B 2009/1516; E06B 9/40; E06B 9/42
See application file for complete search history.

(56) References Cited

U.S. PATENT DOCUMENTS 675,955 A * 6/1901 Kinnear ................. E06B 9/40
114/201 R
3,653,092 A * 4/1972 Shriner ................. E05D 1/06
16/268
(Continued)

FOREIGN PATENT DOCUMENTS

EP 1769958 4/2007
FR 2881463 8/2006
FR 2925102 6/2009

OTHER PUBLICATIONS

Communication for related foreign application EP 14195589.8 dated May 26, 2015.

*Primary Examiner* — Katherine W Mitchell
*Assistant Examiner* — Jeremy C Ramsey
(74) *Attorney, Agent, or Firm* — Steven M. Koehler; Westman, Champlin & Koehler, P.A.

(57) ABSTRACT

A rollo assembly comprises a flexible rollo screen, a rotatable winding shaft to which a first end of the rollo screen is attached for being wound on or off said winding shaft and two opposite longitudinal guides extending in a longitudinal direction perpendicularly to the winding shaft for guiding opposite sides of the rollo screen. The rollo screen further is provided with longitudinally spaced elongate stiffeners extending substantially in a transverse direction in parallel to the winding shaft between the opposite sides of the rollo screen and attached to the flexible rollo screen, which stiffeners are biased for assuming a curved shape in said transverse direction. Each stiffener comprises two stiffener parts which comprise facing edges and wherein each stiffener further comprises a hinge member extending in said transverse direction and joining said facing edges.

16 Claims, 11 Drawing Sheets (51) Int. Cl.
  *B60J 11/00* (2006.01)
  *B60J 7/06* (2006.01)
  *B60J 7/00* (2006.01)

(56) References Cited

U.S. PATENT DOCUMENTS

| | | | | |
|---|---|---|---|---|
| 4,560,245 | A * | 12/1985 | Sarver | B60J 11/08 160/370.21 |
| 4,736,785 | A * | 4/1988 | Seuster | E06B 9/13 160/229.1 |
| 4,825,921 | A * | 5/1989 | Rigter | E06B 9/54 160/23.1 |
| 5,123,473 | A * | 6/1992 | Henkenjohann | E06B 9/15 160/231.1 |
| 5,291,931 | A * | 3/1994 | Kraeutler | E06B 9/063 160/84.01 |
| 6,355,335 | B1 * | 3/2002 | Kulkaski | A01D 34/828 16/225 |
| 6,502,619 | B1 * | 1/2003 | Kraeutler | E06B 9/0692 160/84.01 |
| 7,945,995 | B1 * | 5/2011 | Gates | F21V 15/01 16/226 |
| 2009/0266496 | A1 * | 10/2009 | Dann | E06B 9/24 160/84.05 |
| 2014/0332169 | A1 * | 11/2014 | Van Loosbroek | E06B 9/262 160/12 |
| 2016/0256232 | A1 * | 9/2016 | Awtar | A61B 17/2909 |

* cited by examiner

ROLLO ASSEMBLY

BACKGROUND

The discussion below is merely provided for general background information and is not intended to be used as an aid in determining the scope of the claimed subject matter.

Aspects of the present invention relate to a rollo assembly, comprising a flexible rollo screen, a rotatable winding shaft to which a first end of the rollo screen is attached for being wound on or off said winding shaft and two opposite longitudinal guides extending in a longitudinal direction perpendicularly to the winding shaft for guiding opposite sides of the rollo screen, wherein the rollo screen further is provided with longitudinally spaced elongate stiffeners extending substantially in a transverse direction in parallel to the winding shaft between the opposite sides of the rollo screen and attached to the flexible rollo screen, which stiffeners are biased for assuming a curved shape in said transverse direction.

Such a rollo assembly, as shown for example in EP-A-1 769 958, often is used in a vehicle for shading a roof opening of an open roof construction. The curved shape in said transverse direction is used for conforming the shape of the rollo screen (when wound off from the winding shaft) to a curved shape of an interior side (headliner) of the vehicle roof.

Although such curved stiffeners are effective in offering the rollo screen the desired curved shape, the stiffness needed for maintaining the rollo screen in said curved shape requires substantial forces for straightening the stiffeners when the rollo screen with stiffeners are wound onto the winding shaft. These forces which act directly on the stiffeners, and thus too act on the rollo screen, may lead to permanent deformations (depressions or markings) in the rollo screen which in a negative way influence the appearance of the rollo screen (and which further in some instances may shorten the lifespan of the rollo screen).

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

A rollo assembly is provided in which each stiffener comprises two stiffener parts which comprise facing edges and wherein each stiffener further comprises a hinge member extending in said transverse direction and joining said facing edges.

In an operative position in which the stiffener parts and corresponding part of the rollo screen are wound off from the winding shaft, the bias forces the stiffener parts into their curved shape (conforming, for example, to the inner shape of a vehicle roof). In such a position the hinge member also assumes the same curved shape. When the stiffener parts and corresponding rollo screen are wound onto the winding shaft, the stiffener parts will rotate (by means of the hinge member) relative to each other (or, in other words, the angle—considered in the longitudinal direction—between the stiffener parts will change) because the stiffener parts want to follow or assume the circular contour of the winding shaft. Such a relative rotation of the two stiffener parts, however, only is possible when the hinge member moves to a straight position, which also leads to straightening the stiffener parts. Thus, the force for straightening the stiffener parts is generated by the hinge member and the forces acting on the rollo screen are reduced dramatically.

It is noted that the forces required for rotating the stiffener parts relative to each other in accordance with the present invention also will act on the rollo screen, but these forces act over a greater length of the stiffener parts (thus reducing local pressures and the risk on markings in the rollo screen), whereas in the above state of the art such forces basically would act only at the outer ends and at a central part of the stiffener, resulting in much higher local pressures with resulting markings in the rollo screen.

In one embodiment of the rollo assembly the stiffener parts also are curved in said longitudinal direction. Such a curvature in the longitudinal direction (meaning that the stiffener parts are curved when seen in a cross section extending in the longitudinal direction, in contrast to the curved shape in the transverse direction which can be seen in a cross section extending in the transverse direction) may enhance the stiffness of the stiffener parts which is required for maintaining the rollo screen in the desired shape when wound off from the winding shaft.

In such an embodiment it is advantageous when the stiffener parts have a curvature in said longitudinal direction with such an orientation and with such a radius of curvature that the stiffener parts closely conform to the effective outer curved shape of the winding shaft when wound thereon. As a result the rollo screen with stiffeners can be wound onto the winding shaft in a very dense manner, keeping the dimensions of the winding shaft with rollo screen wound thereon as limited as possible. Also, the rollo screen, when rolled over the stiffeners, faces less obstructions which could lead to wrinkles and indentations. It should be noted that said curvature in the longitudinal direction may be different for different stiffeners because the effective outer curved shape of the winding shaft depends upon the amount of rollo screen with stiffeners wound thereon.

In one embodiment of the rollo assembly the hinge member extends substantially continuously in said transverse direction over the entire length of the stiffener parts. This means that the stiffener parts are connected to each other by the hinge member over their entire length (as seen in the transverse direction).

As an alternative, however, it is conceivable that the hinge member comprises a number of discrete transversally spaced hinge parts, such that the stiffener parts are connected to each other at some places only and not continuously over their entire length. For example the hinge member may comprise two outer hinge parts close to the opposite sides of the rollo screen (in the region of the longitudinal guides) and an intermediate hinge part between said outer hinge parts.

The function of the hinge member is to assure that during rotation of the stiffener parts relative to each other the forces are generated to straighten the stiffener parts. The hinge member may define only one or a number of hinge axes and in both cases the desired result will be obtained.

Thus, in one embodiment the hinge member comprises a central hinge body and two spaced hinge axes each defining a hinged connection between the central hinge body and a corresponding one of the stiffener parts. In this embodiment two hinge axes are defined which together allow the stiffener parts to rotate as required while generating the forces for straightening the stiffener parts (at the same time both hinge axes are transformed from a curved shape into a straight shape).

The hinge member may define the hinge axis or axes in many different manners. For example the two stiffener parts may be integrally interconnected by an interconnecting part and wherein in said interconnecting part at least one living hinge is defined for realizing a hinged connection. Thus, in such an embodiment the hinge member comprises said interconnecting part which defines at least one living hinge.

But also when the stiffener parts are connected to the hinge member in a different manner (thus not being integrally connected therewith, wherein integrally connected may mean that they are simultaneously made of and connected by the same material or different materials), such a hinge member may define living hinges. As an alternative other hinge mechanisms may be applied, for example with cooperating parts connected by a physical hinge shaft.

In one embodiment the stiffener parts have free edges remote from their facing edges, which free edges in a position in which said stiffener parts are not wound onto the winding shaft, are spaced from the rollo screen. This may prevent visible markings (e.g. depressions) in such a position which could negatively influence the appearance of the rollo screen.

At least one of the stiffener parts and the hinge member may be attached to the rollo screen, for example only both stiffener parts or only the hinge member.

In another embodiment of the rollo assembly the stiffener parts of a stiffener each are received in one of a pair of pockets provided on the rollo screen, wherein the pockets are defined by a flexible cloth part connected to the rollo screen and wherein said cloth part comprises a central cloth part located between the adjacent stiffener parts and attached to the rollo screen, which central cloth part is sufficiently stiff to prevent a substantial collapse of said cloth part in the longitudinal direction. In such an embodiment the central cloth part defines the hinge member which, because of its stiffness, is capable of generating the required forces for straightening the stiffener parts when the rollo is wound onto the winding shaft (if the central cloth part would not be sufficiently stiff, the curved stiffener parts would be allowed to rotate relative to each other while maintaining a curved shape; the central cloth part then simply would deform for allowing such a movement).

In yet another embodiment the flexible rollo screen at each stiffener is divided into two adjacent rollo screen parts each having edge parts which are folded back and connected to each other at respective folding lines extending in the transverse direction and which are attached to corresponding ones of the stiffener parts and wherein the hinge member is defined by said folding lines. Basically, in such an embodiment the place where the two rollo screen parts meet (and are provided with folding lines) will act as the hinge member which as such (because these rollo screen parts are part of the rollo screen) is connected to the rollo screen. The manner in which the stiffener parts are connected to the rollo screen parts, may vary in many ways.

In one embodiment each stiffener part at its opposite ends is provided with slide shoes for cooperation with the respective longitudinal guides. This is an alternative for embodiments in which the opposite sides of the rollo screen directly engage such guides.

If indeed such slide shoes are used, the slide shoes of two stiffener parts of the same stiffener that cooperate with the same longitudinal guide should be interconnected by a hinge which is located substantially in line with the hinge member joining said stiffener parts. This ensures that the stiffener parts are kept in an optimal relative position while still allowing them to be rotated relative to each other when the rollo screen is wound onto the winding shaft.

The stiffener parts to be used in a rollo assembly may have many different designs. Without the intention to provide a complete overview of possible embodiments, the following specific configurations may be mentioned: a profiled member (for example manufactured by extrusion); a hollow member (for which extrusion also is a convenient method for manufacturing); a member made of a single material (for example plastic, metal or even a natural material such as wood); a member made of at least two different materials (wherein the two parts of different material may be manufactured simultaneously, for example by co-extrusion or a 2 K molding process, or may be manufactured separately and joined afterwards).

For attaching the elongate stiffeners to the flexible rollo screen (but also for connecting other parts of the rollo assembly) any of the following methods may be used (without limiting the possibilities to only these methods): gluing, stitching, welding, molding.

Finally an embodiment of the rollo assembly is mentioned in which the flexible rollo screen comprises a main layer substantially defining the mechanical characteristics of the rollo screen and having a surface to which the stiffeners are attached, and an optical layer attached to an opposite surface of said main layer. The main layer substantially provides the strength, resistance, flexibility and other mechanical characteristics to the rollo screen as needed in any particular use; the optical layer may provide other characteristics which are not directly responsible for the mechanical characteristics. Although these characteristics mainly will comprise visible features (such as colour and pattern), they also may comprise other characteristics, such as the feel of the rollo screen (for example soft or rough).

It is noted that a stiffener in order to be capable of assuming the desired curved shape in the transverse direction (which, by the way, with respect to the stiffener itself is a longitudinal direction and which is referred to below as first direction), should be sufficiently flexible in said direction. In the longitudinal direction (which again with respect to the stiffener itself is a transverse direction and which is referred to below as second direction) however the stiffener should be sufficiently stiff such that it can withstand forces generated during the rotation of the two stiffener parts relative to each other without collapsing or deforming. Thus, generally in said first direction the stiffness will be less than the stiffness in said second direction.

The main field of use of the rollo assembly will be vehicles, especially open roof constructions of vehicles; however, also other fields of use (for example domestic) are conceivable.

BRIEF DESCRIPTION OF THE DRAWINGS

Hereinafter aspects of the invention will be elucidated while referring to the drawings, in which.

DETAILED DESCRIPTION OF THE ILLUSTRATIVE EMBODIMENTS

Figure 1:
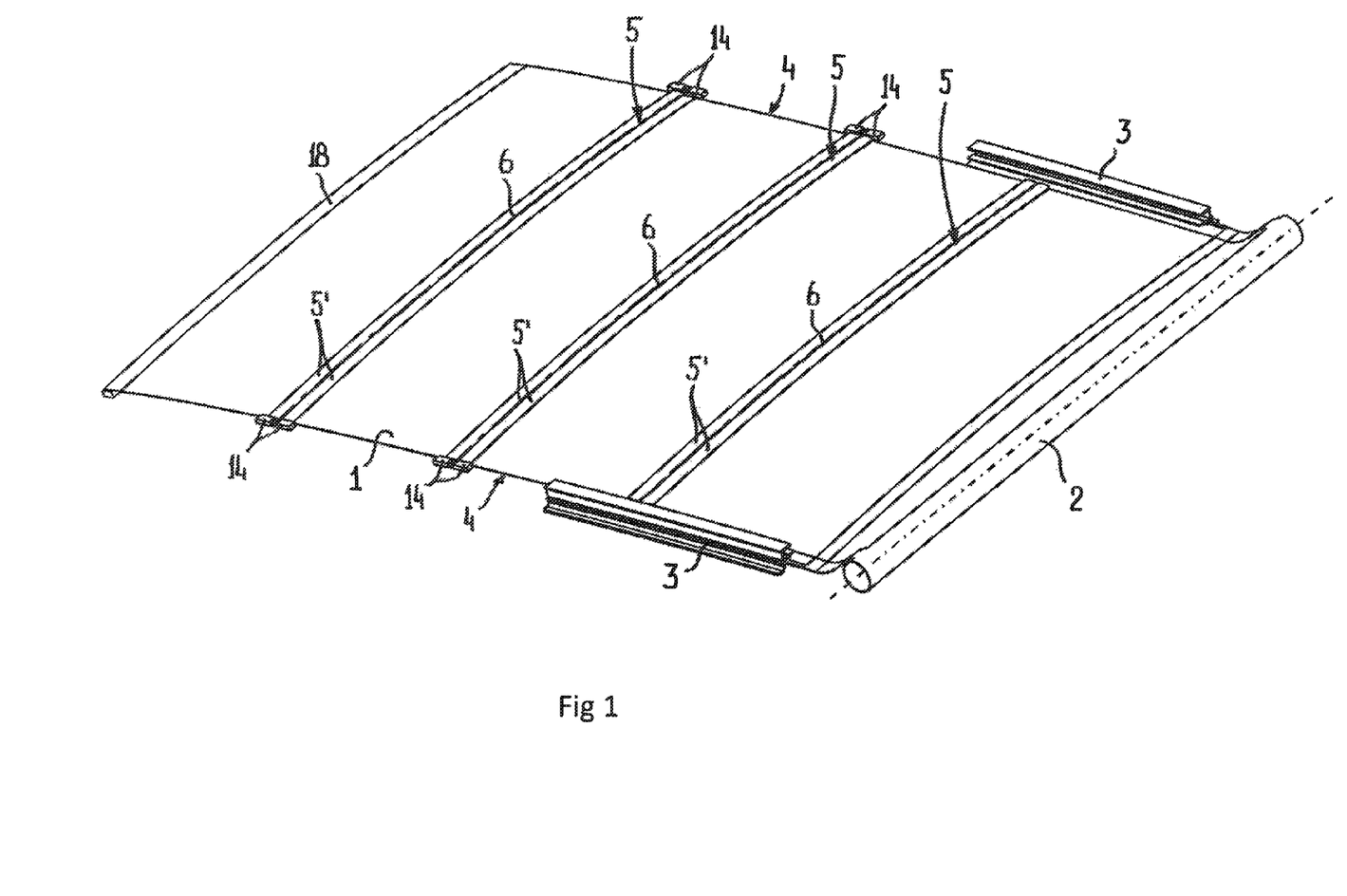
FIG. 1, in a schematic perspective view, illustrates the principles of the present invention as applied in a rollo assembly.

Firstly referring to FIG. 1 a rollo assembly is illustrated. As its essential parts it comprises a flexible rollo screen 1, a rotatable winding shaft 2 to which a first end of the rollo screen 1 is attached for being wound on or off said winding shaft 2 and two opposite longitudinal guides 3 (only represented partially) extending in a longitudinal direction perpendicularly to the winding shaft for guiding opposite sides 4 of the rollo screen 1. The rollo screen 1 further is provided with longitudinally spaced elongate stiffeners 5 which extend substantially in a transverse direction in parallel to the winding shaft 2 between the opposite sides 4 of the rollo screen 1 and which are attached to the flexible rollo screen 1 (in a manner to be described later). These stiffeners 5 are biased for assuming a curved shape in said transverse direction (for example in correspondence with the shape of an inner side or headliner of a roof part of a vehicle).

At its leading end the rollo screen 1 may be provided by a pull beam 18 for manually operating the rollo assembly (as is generally known). The ends of the pull beam 18 as well as slide shoes 14 (elucidated below with respect to FIGS. 8a and 8b) at opposite ends of the stiffeners 5 may be guided in the guides 3

When the rollo screen 1 with stiffeners 5 is wound onto the winding shaft 2, the rollo screen 1 together with said stiffeners 5 has to be straightened (flattened) for adopting the (lengthwise) straight shape of the winding shaft 2. For preventing that this straightening or flattening occurs mainly by forces generated directly by the winding shaft 2 (by pressing the outer ends of the stiffeners 5 upwardly, as seen in FIG. 1) which could lead to markings on the rollo screen 1, in accordance with the present invention each stiffener 5 comprises two stiffener parts 5' which comprise facing edges which are joined by a hinge member 6 extending in said transverse direction. As a result, when the stiffener parts 5' rotate relative to each other (as allowed by the hinge member 6) for assuming the curved (circular) contour of the winding shaft 2, the hinge member 6 and the stiffener parts 5' connected thereto automatically will be forced into a straight position without the occurrence of large (local) pressures between the winding shaft 2 and rollo screen 1. Thus, markings of any kind in the rollo screen 1 as a result of such pressures may be prevented.

Figure 2:
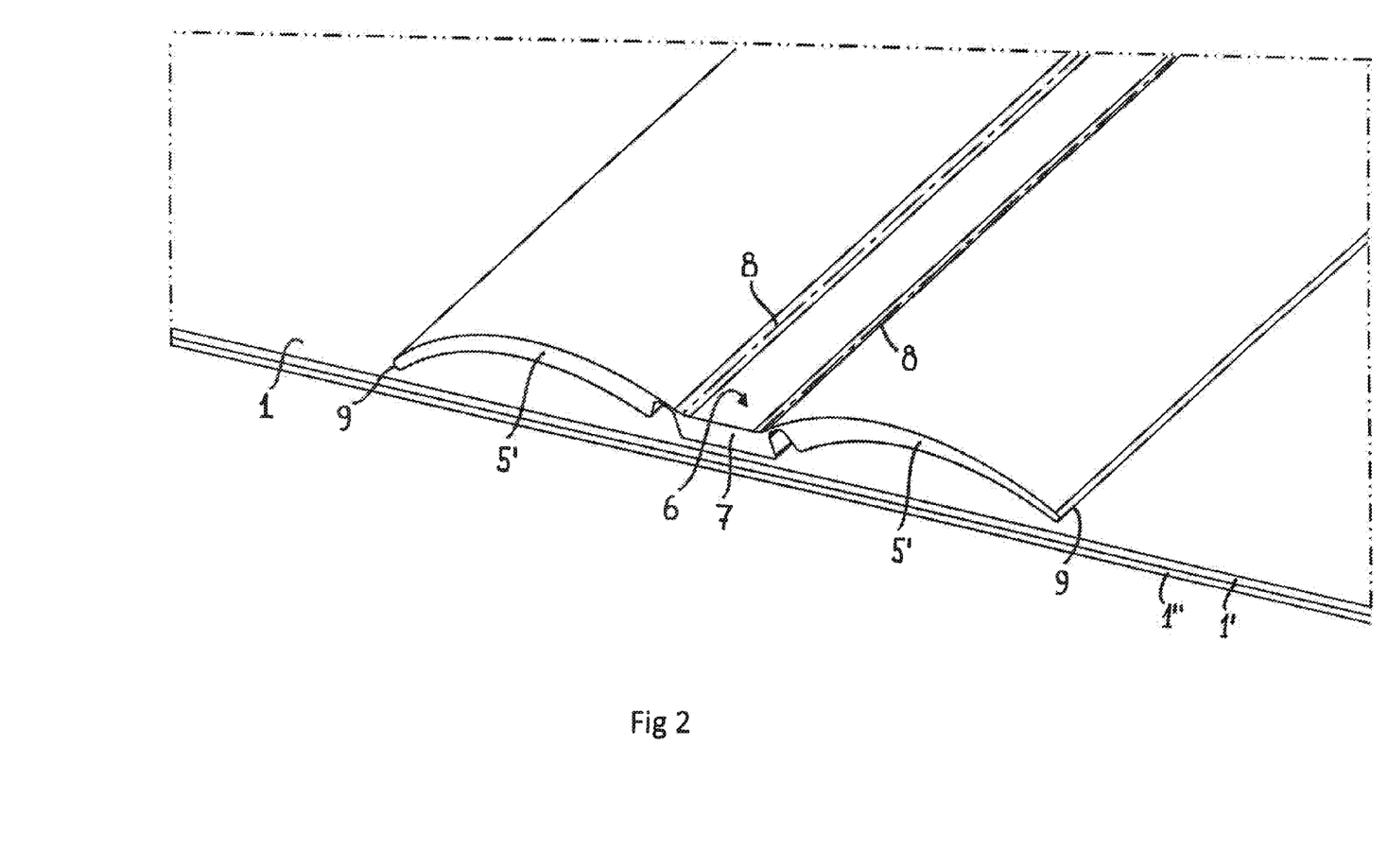
FIG. 2 schematically and perspectively illustrates part of an embodiment of the rollo assembly.

FIG. 2 shows a detail of an embodiment of the rollo assembly, in which the stiffener parts 5' in addition also are curved in said longitudinal direction. This allows them to be wound onto the winding shaft in a dense configuration, specifically when the stiffener parts 5' have a curvature in said longitudinal direction with such an orientation and with such a radius of curvature that the stiffener parts 5' closely conform to the effective outer curved shape of the winding shaft 2 (as defined by the winding shaft 2 and any amount of rollo screen 1 and stiffeners 5 wound thereon).

FIG. 2 too illustrates an embodiment of the hinge member 6 which comprises a central hinge body 7 connected to the rollo screen 1 (in any known matter, for example gluing, stitching, welding, molding) and two spaced hinge axes 8 (shown in chain lines) each defining a hinged connection between the central hinge body 7 and a corresponding one of the stiffener parts 5'. The hinge axes 8 for example may comprise living hinges.

Figure 5:
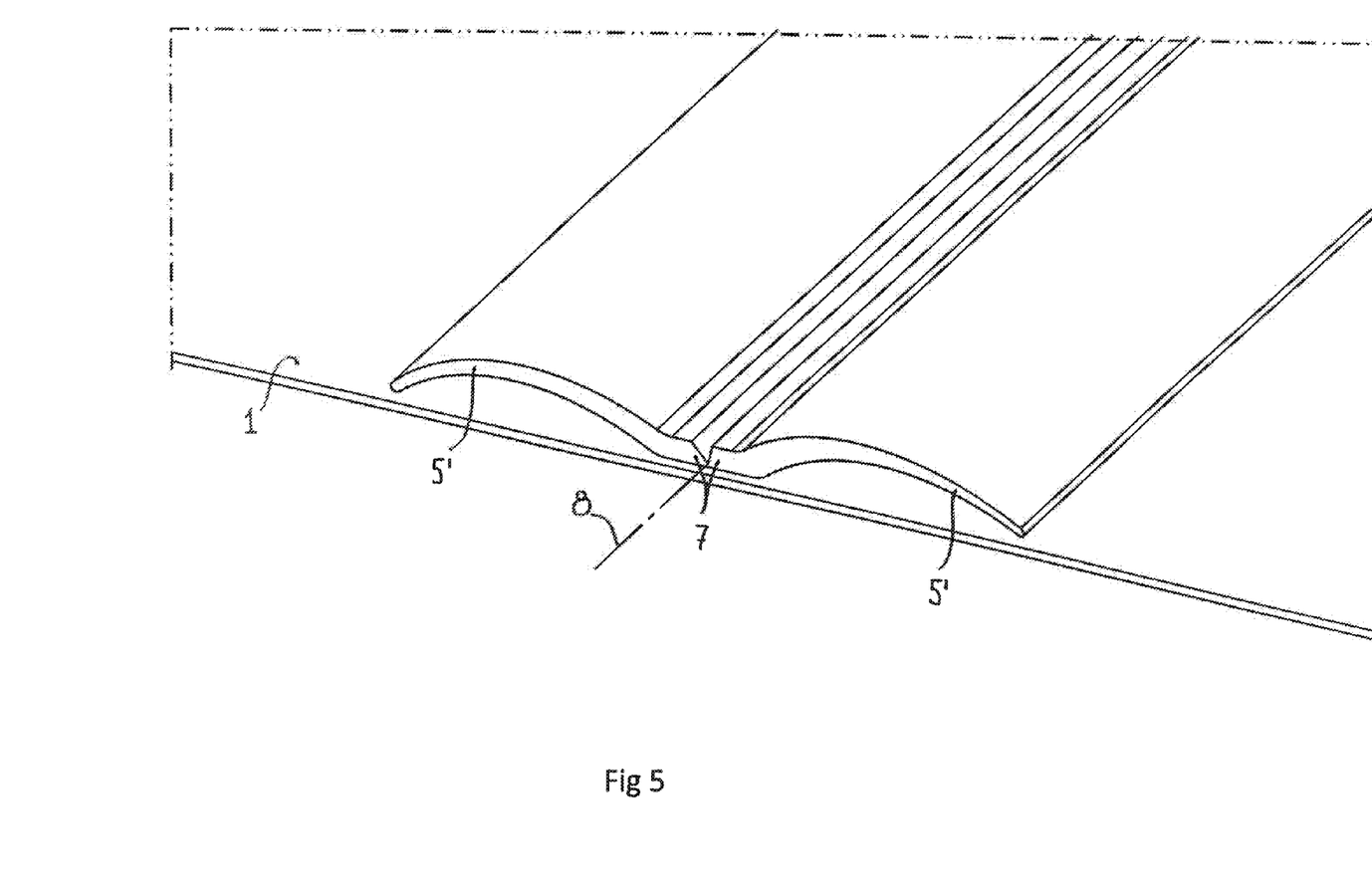

Said hinge axes 8 may be defined as a part of the central hinge body 7, but in another embodiment the two stiffener parts 5' are integrally interconnected by an interconnecting part (for example said central hinge body 7) which is connected to the rollo screen 1 and wherein in said interconnecting part at least one living hinge is defined for realizing a hinged connection. Such an embodiment is illustrated in FIG. 5.

Figure 3:
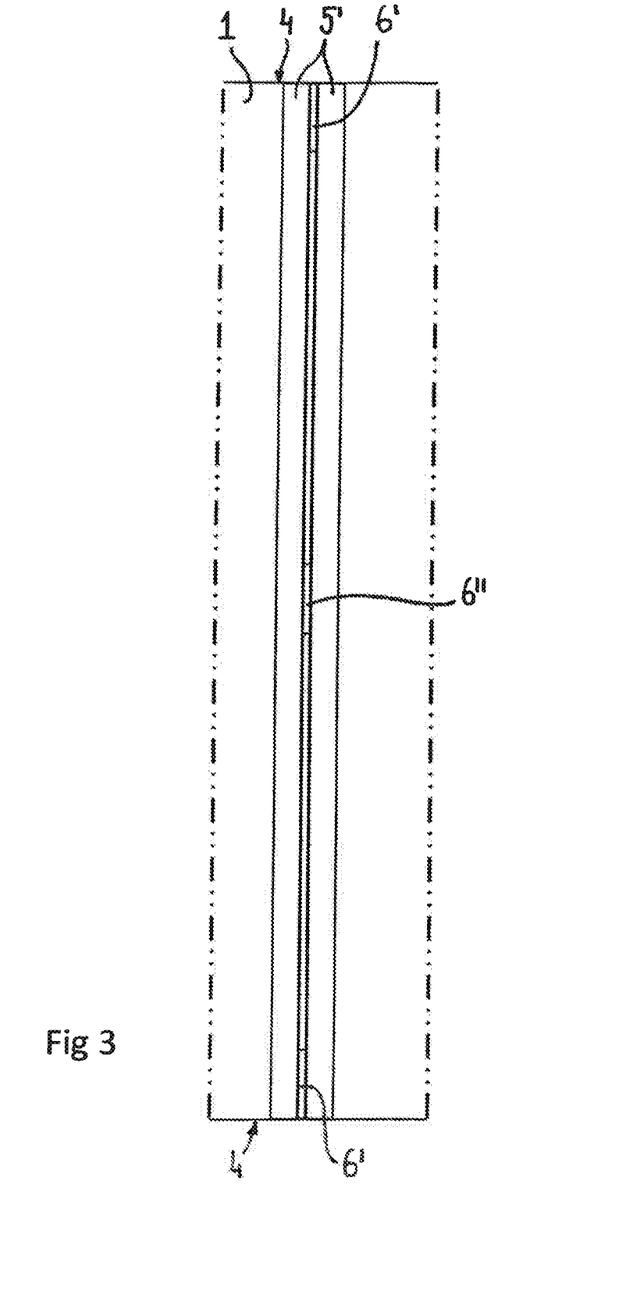
FIG. 3 schematically and in a top plan view illustrates a different embodiment for positioning the hinge member.

The hinge member 6 may extend substantially continuously in said transverse direction over the entire length of the stiffener parts 5' (as illustrated for example in FIG. 2). FIG. 3, however, illustrates the possibility that the hinge member comprises a number of discrete transversally spaced hinge parts, in this case specifically two outer hinge parts 6' close to the opposite sides 4 of the rollo screen 1 and an intermediate hinge part 6" between said outer hinge parts 5'. Each of these hinge parts 6',6" may define one or more hinge axes.

Again referring to FIG. 2, it appears that in the illustrated embodiment the stiffener parts 5' have free edges 9 remote from their facing edges (the latter in this case substantially being defined by the parts of the stiffener parts 5' at the location of the hinge axes 8), which free edges 9 in the illustrated position in which said stiffener parts 5' are not wound onto the winding shaft 2, are spaced from the rollo screen 1.

FIG. 2 also shows that the flexible rollo screen 1 comprises a main layer 1' substantially defining the mechanical characteristics of the rollo screen 1 and having a surface (in this specific embodiment an upper surface) to which the stiffeners 5 are, indirectly through the hinge member, attached and an optical layer 1" attached to an opposite (lower) surface of said main layer 1'.

Figure 4:
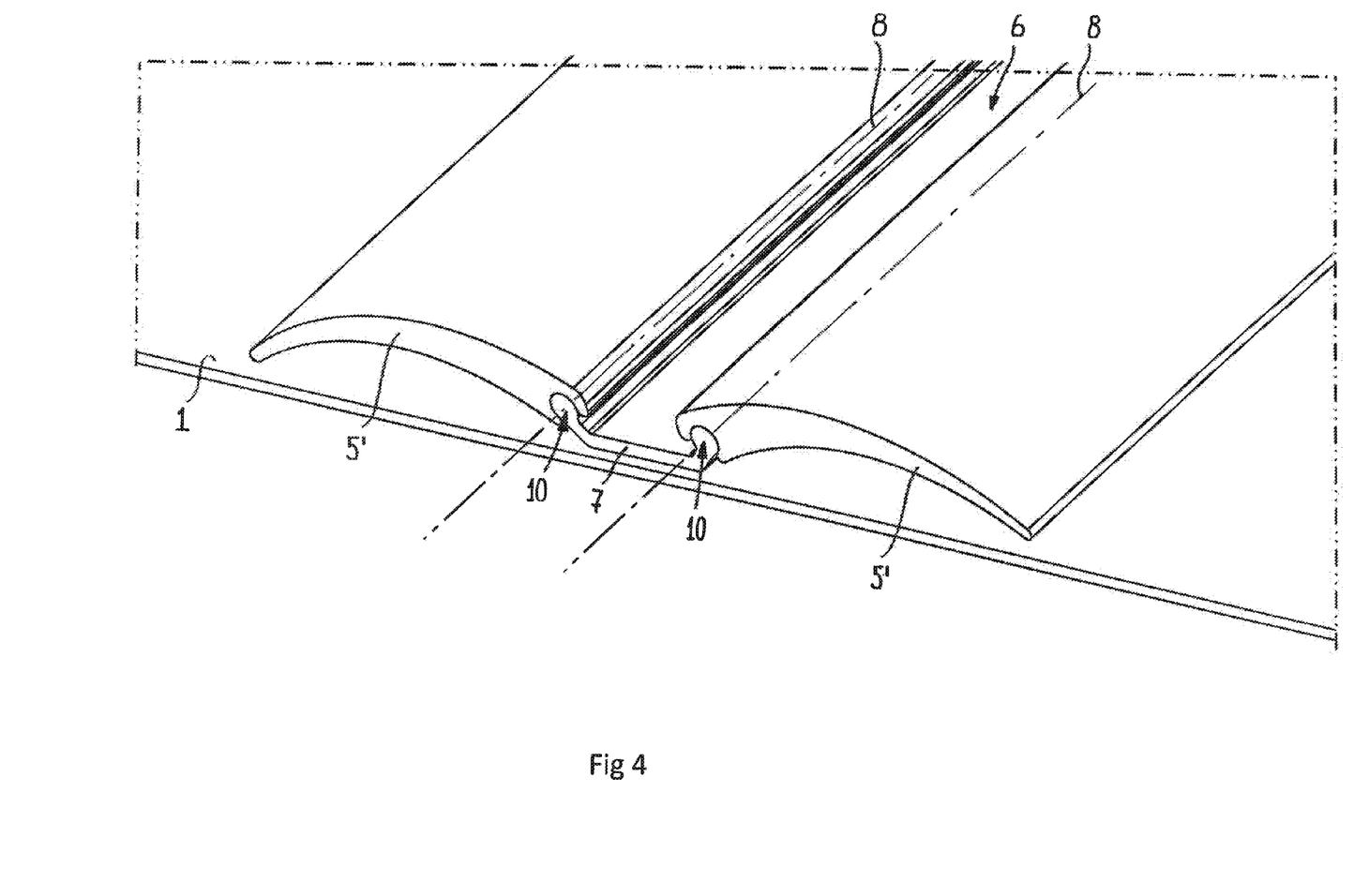
FIGS. 4-7 schematically and perspectively show different embodiments of the rollo assembly.

FIG. 4 illustrates an embodiment in which the stiffener parts 5' and the hinge member 6 have cooperating parts (generally indicated as 10) with matching shapes for defining the hinge axes 8.

Figure 6:
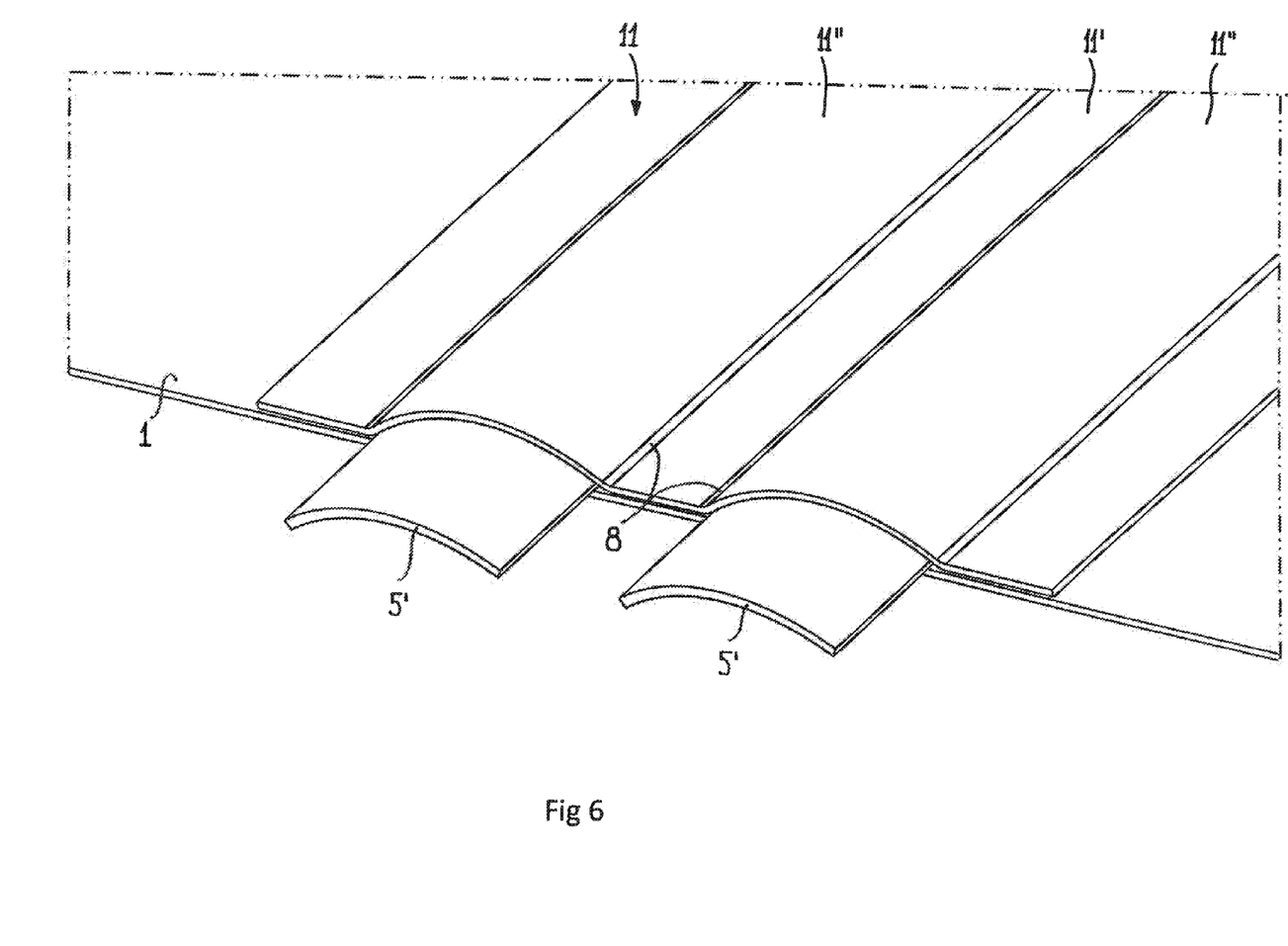

FIG. 6 shows an embodiment in which the stiffener parts 5' of a stiffener 5 each are received in one of a pair of cloth pockets 11" provided on the rollo screen 1. The cloth pockets 11" are defined by a flexible cloth part 11 connected to the rollo screen 1. Said cloth part 11 comprises a central cloth part 11' that is located between the adjacent stiffener parts 5' (or, in other words, between the cloth pockets 11" defined by the cloth part 11) and that is attached to the rollo screen 1 (again in any convenient manner). The central cloth part 11' is sufficiently stiff to prevent a substantial collapse of said cloth part 11' in the longitudinal direction; as a result hinge axes 8 are defined where the central cloth part 11' meets the cloth pockets 11".

Figure 7:
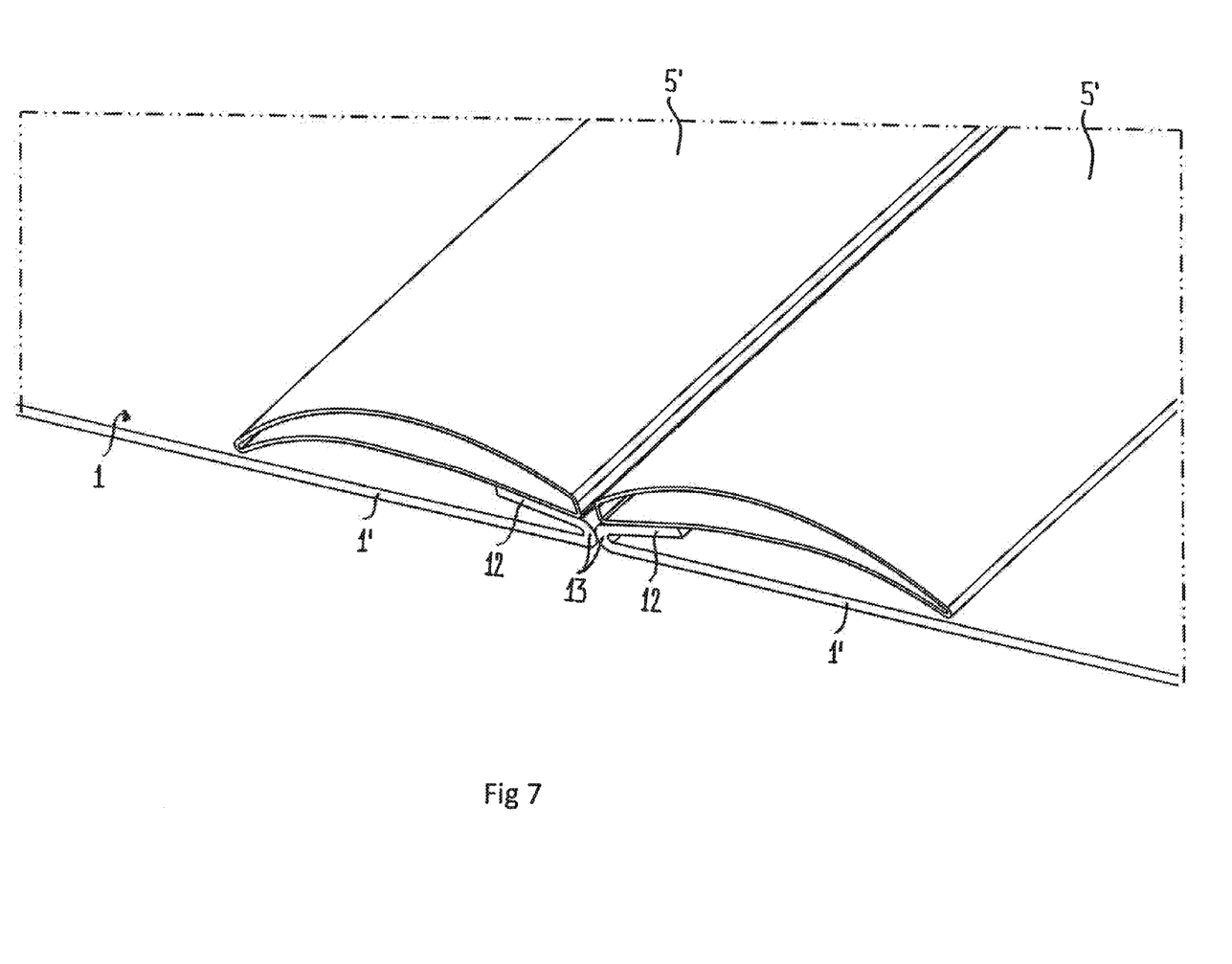

In the embodiment illustrated in FIG. 7 the flexible rollo screen 1 at each stiffener (or stiffener parts 5') is divided into two adjacent rollo screen parts 1' each having edge parts 12 which are folded back and connected to each other at respective folding lines 13 extending in the transverse direction. The edge parts 12 are attached to corresponding ones of the stiffener parts 5' and the hinge member is defined by said folding lines 13 (or at least a region of the rollo screen parts 1' in the vicinity of said folding lines 13).

Figure 8A:
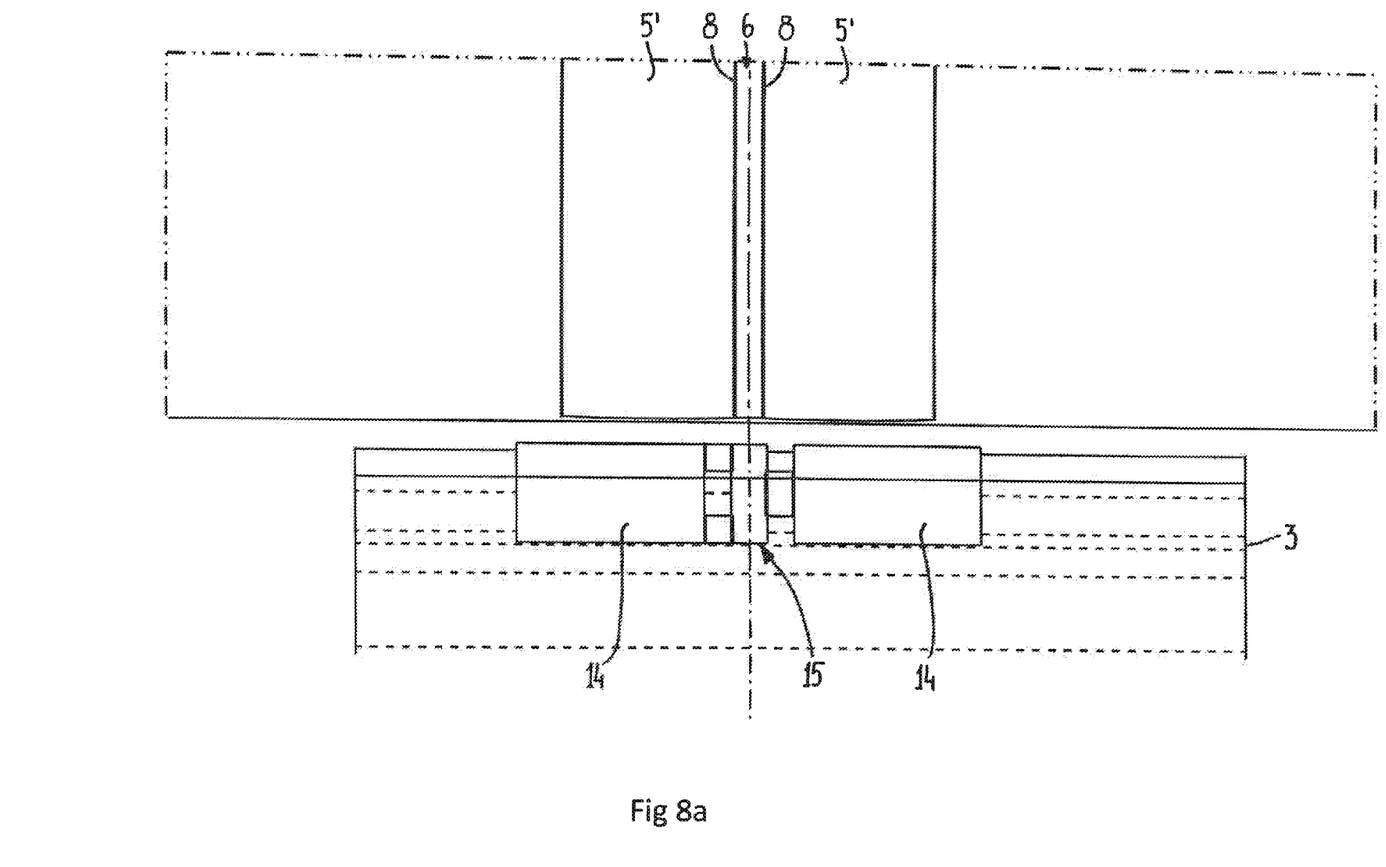
FIGS. 8a and 8b schematically in a top plan view and perspectively illustrate an embodiment of the rollo assembly with slide shoes, and FIGS. 9 and 10 schematically show cross sections illustrating two different stiffener part designs.
Figure 8B:
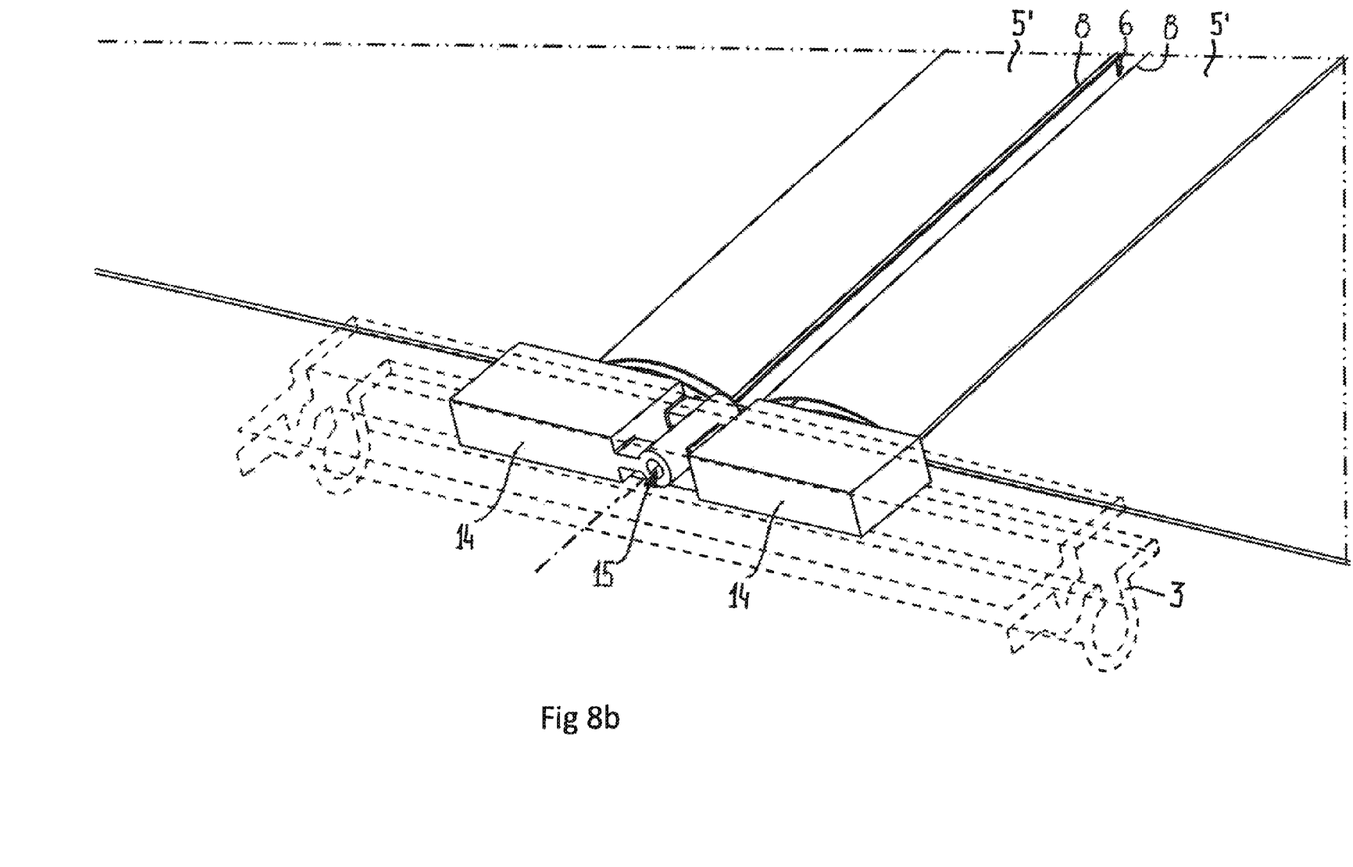

Referring now to FIGS. 8a and 8b, an embodiment is illustrated in which each stiffener part 5' at its opposite ends (only one of which is shown) is provided with slide shoes 14 for cooperation with the respective longitudinal guides 3 (here illustrated in broken lines). The slide shoes 14 of two stiffener parts 5' of the same stiffener that cooperate with the same longitudinal guide 3 are interconnected by a hinge 15 which is located substantially in line (as illustrated schematically by a chain line in FIG. 8*a*) with the hinge member 6 joining said stiffener parts 5'. In the illustrated embodiment said hinge member 6 defines two hinge axes 8 and the hinge 15 is located substantially halfway between these hinge axes 8; if the hinge member 6 would define only one hinge axis 8 (as, for example, in FIG. 5) the hinge 15 substantially would be aligned with said hinge axis 8.

Figure 9:
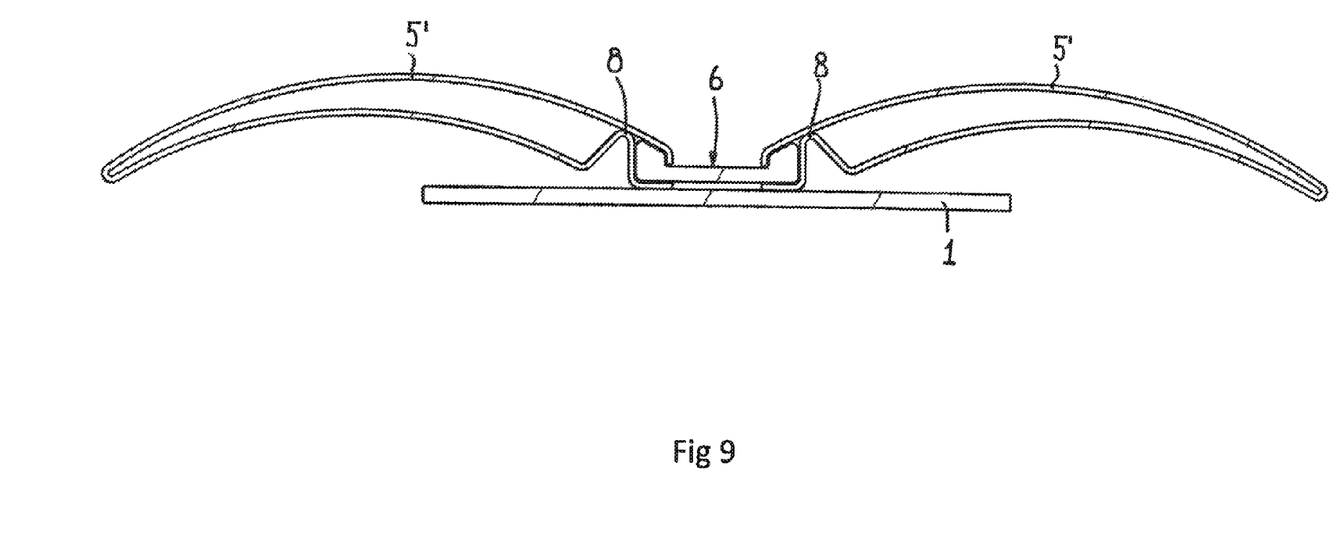
Figure 10:
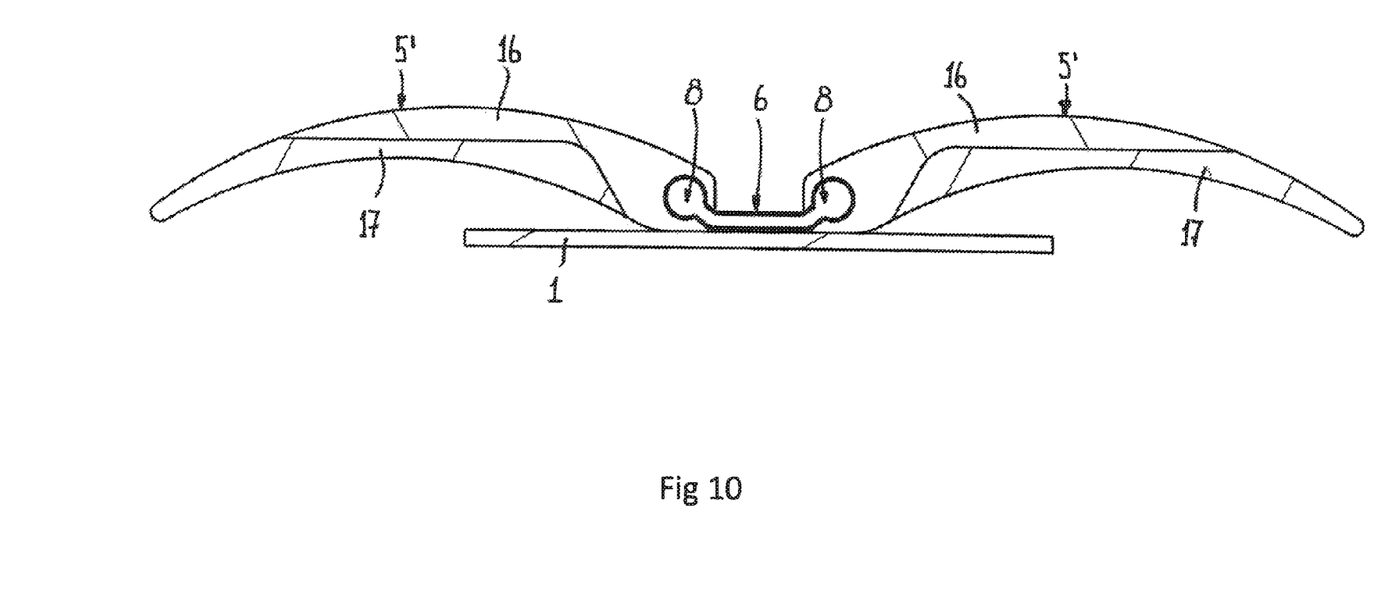

FIG. 9 shows hollow stiffener parts 5', and FIG. 10 shows stiffener parts 5' comprising each two parts 16,17 made of different materials. These are only examples for illustrating some of the possibilities for designing the stiffener parts 5'.

Although the subject matter has been described in language specific to structural features and/or methodological acts, it is to be understood that the subject matter defined in the appended claims is not necessarily limited to the specific features or acts described above as has been held by the courts. Rather, the specific features and acts described above are disclosed as example forms of implementing the claims.

The invention claimed is:

1. A rollo assembly, comprising a flexible rollo screen, a rotatable winding shaft to which a first end of the rollo screen is attached for being wound on or off said winding shaft, and two opposite longitudinal guides extending in a longitudinal direction perpendicularly to the winding shaft configured to guide opposite sides of the rollo screen, wherein the rollo screen further is provided with longitudinally spaced elongate stiffeners extending substantially in a transverse direction in parallel to the winding shaft between the opposite sides of the rollo screen and attached to the flexible rollo screen, which stiffeners are biased for assuming a curved shape in said transverse direction, wherein each stiffener comprises two stiffener parts which comprise facing edges and wherein each stiffener further comprises a hinge member extending along a hinge axis, with at least one specific location, the hinge member extending continuously in said transverse direction between the opposite sides of the rollo screen and joining said facing edges, to define a continuous at least one hinge axis.

2. The rollo assembly according to claim 1, wherein the stiffener parts also are curved in said longitudinal direction.

3. The rollo assembly according to claim 2, wherein the stiffener parts have a curvature in said longitudinal direction with such an orientation and with such a radius of curvature that the stiffener parts closely conform to an effective outer curved shape of the winding shaft when wound thereon.

4. The rollo assembly according to claim 1, wherein the hinge member comprises a central hinge body and two spaced hinge axes each defining a hinged connection between the central hinge body and a corresponding one of the stiffener parts.

5. The rollo assembly according to claim 1, wherein the two stiffener parts are integrally interconnected by an interconnecting part and wherein in said interconnecting part at least one living hinge is defined for realizing a hinged connection.

6. The rollo assembly according to claim 1, wherein the stiffener parts have free edges remote from their facing edges, the free edges spaced apart from the rollo screen in a position in which said stiffener parts are not wound onto the winding shaft.

7. The rollo assembly according to claim 1, wherein at least one of the two stiffener parts and the hinge member is attached to the rollo screen.

8. The rollo assembly according to claim 1, wherein the stiffener parts of a stiffener each are received in one of a pair of pockets provided on the rollo screen, wherein the pockets are defined by a flexible cloth part connected to the rollo screen and wherein said cloth part comprises a central cloth part located between adjacent stiffener parts and attached to the rollo screen, which central cloth part is sufficiently stiff to prevent a substantial collapse of said cloth part in the longitudinal direction.

9. The rollo assembly according to claim 1, wherein the flexible rollo screen at each stiffener is divided into two adjacent rollo screen parts each having edge parts which are folded back and connected to each other at respective folding lines extending in the transverse direction and which are attached to corresponding ones of the stiffener parts and wherein the hinge member is defined by said folding lines.

10. The rollo assembly according to claim 1, wherein each stiffener part at its opposite ends is provided with slide shoes for cooperation with the respective longitudinal guides.

11. The rollo assembly according to claim 10, wherein the slide shoes of two stiffener parts of the same stiffener that cooperate with the same longitudinal guide are interconnected by a hinge which is located substantially in line with the hinge member joining said stiffener parts.

12. The rollo assembly according to claim 1, wherein the stiffener parts have at least one of the following configurations: a profiled member, a hollow member, a member made of a single material, a member made of at least two materials, a metal member, a plastic member.

13. The rollo assembly according to claim 1, wherein the elongate stiffeners are attached to the flexible rollo screen by any of the following methods: gluing, stitching, welding, molding.

14. The rollo assembly according to claim 1, wherein the flexible rollo screen comprises a main layer substantially defining mechanical characteristics of the rollo screen and having a surface to which the stiffeners are attached, and an optical layer attached to an opposite surface of said main layer.

15. A rollo assembly, comprising a flexible rollo screen, a rotatable winding shaft to which a first end of the rollo screen is attached for being wound on or off said winding shaft, and two opposite longitudinal guides extending in a longitudinal direction perpendicularly to the winding shaft configured to guide opposite sides of the rollo screen, wherein the rollo screen further is provided with longitudinally spaced elongate stiffeners extending substantially in a transverse direction in parallel to the winding shaft and between the opposite sides of the rollo screen and attached to the flexible rollo screen, which stiffeners are biased for assuming a curved shape in said transverse direction, wherein each stiffener comprises two stiffener parts which comprise facing edges and wherein each stiffener further comprises a hinge member having a hinge axis, with a specific location, extending continuously in said transverse direction between the opposite sides of the rollo screen and joining said facing edges to define a continuous hinge axis, wherein the stiffener parts also are curved in said longitudinal direction, and wherein the curvature in said longitudinal direction is at such an orientation and with such a radius of curvature that the stiffener parts closely conform to an effective outer curved shape of the winding shaft when wound thereon.

16. A rollo assembly, comprising a flexible rollo screen, a rotatable winding shaft to which a first end of the rollo screen is attached for being wound on or off said winding shaft, and two opposite longitudinal guides extending in a longitudinal direction perpendicularly to the winding shaft configured to guide opposite sides of the rollo screen, wherein the rollo screen further is provided with longitudinally spaced elongate stiffeners extending substantially in a transverse direction in parallel to the winding shaft between the opposite sides of the rollo screen and attached to the flexible rollo screen, which stiffeners are biased for assuming a curved shape in said transverse direction, wherein each stiffener comprises two stiffener parts which comprise facing edges and wherein each stiffener further comprises a hinge member extending in said transverse direction along a continuous hinge axis between the two opposite longitudinal guides and joining said facing edges, wherein the stiffener parts have a curvature in said longitudinal direction with such an orientation and with such a radius of curvature that the stiffener parts closely conform to an effective outer curved shape of the winding shaft when wound thereon.

\* \* \* \* \*